United States Patent [19]

Barrett

[11] Patent Number: 5,602,643
[45] Date of Patent: Feb. 11, 1997

[54] METHOD AND APPARATUS FOR CORRECTING SURFACE PROFILES DETERMINED BY PHASE-SHIFTING INTERFEROMETRY ACCORDING TO OPTICAL PARAMETERS OF TEST SURFACE

[75] Inventor: Harrison H. Barrett, Tucson, Ariz.

[73] Assignee: Wyko Corporation, Tucson, Ariz.

[21] Appl. No.: 597,796

[22] Filed: Feb. 7, 1996

[51] Int. Cl.⁶ .................................................. G01B 9/02
[52] U.S. Cl. ........................................ 356/360; 356/351
[58] Field of Search .................................. 356/345, 359, 356/360, 351

[56] References Cited

U.S. PATENT DOCUMENTS 5,387,975  2/1995  Ishida et al. ............................ 356/359
5,548,403  8/1996  Sommargren ........................... 356/360

OTHER PUBLICATIONS

Max Born & Emil Wolf, "Principles of Optics," Fourth Edition, pp. 614–617.

Primary Examiner—Georgia Epps
Assistant Examiner—Robert Kim
Attorney, Agent, or Firm—Antonio R. Durando

[57] ABSTRACT

An improvement to phase-shifting interferometry that consists of the addition of a pupil mask with two parallel slits and a polarizer in the optical path of a conventional phase-shifting interferometer. The pupil-mask/polarizer combination is adapted to produce a linearly polarized wavefront of light reaching the sample surface at a predetermined angle of incidence, thereby producing a corresponding phase shift on reflection. The relative orientation of the mask and polarizer can be changed to take measurements with the polarizer parallel or perpendicular to the mask slits, in each case producing a phase shift on reflection related to the test sample's refractive index and extinction coefficient. Four phase-shifting measurements conducted at $\pi/2$ intervals for each polarization axis yield sufficient interferometric information to map n, k and the height profile of the sample surface. The preferred mask consists of an opaque disk structure having two opposite annular slits approximately 90-degrees wide and with an outer annular radius approximately twice the size of the inner annular radius.

24 Claims, 3 Drawing Sheets

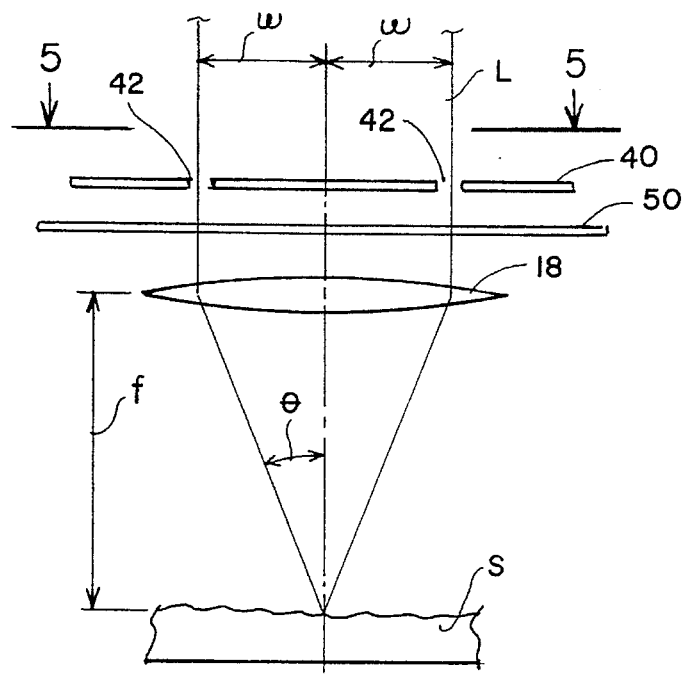
FIG. 3
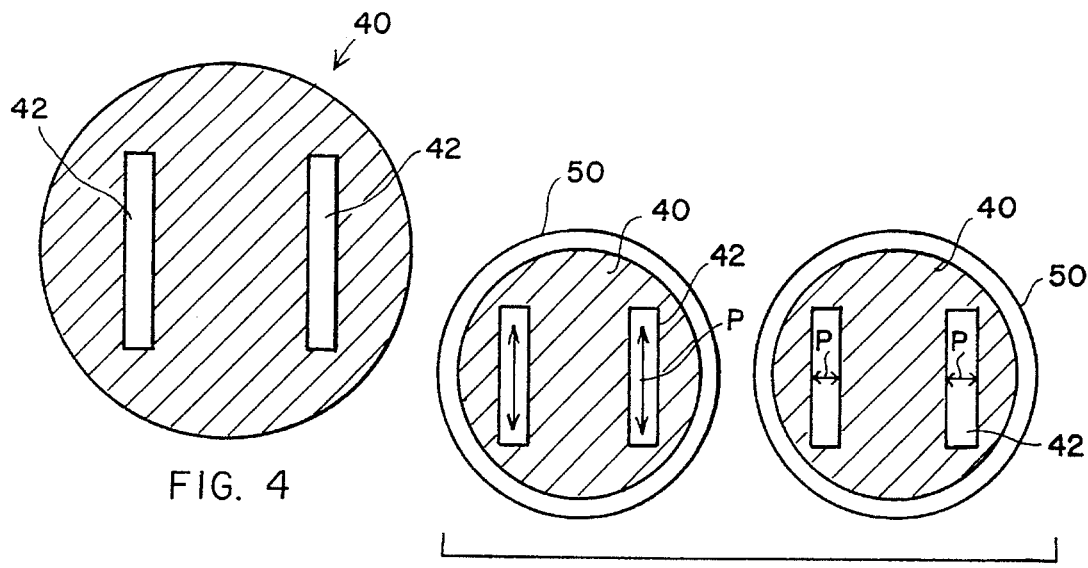
FIG. 4
FIG. 5
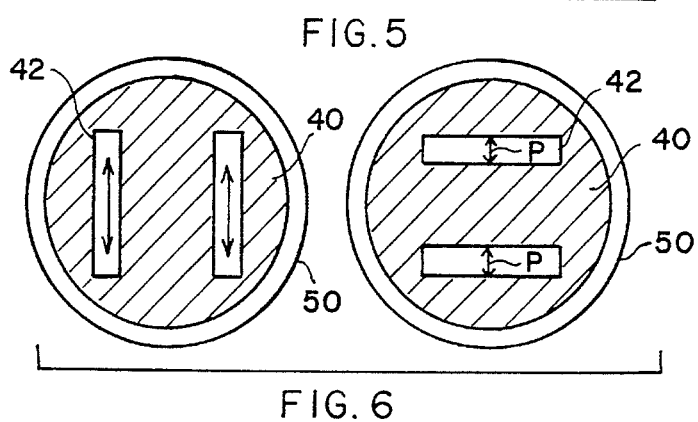
FIG. 6

METHOD AND APPARATUS FOR CORRECTING SURFACE PROFILES DETERMINED BY PHASE-SHIFTING INTERFEROMETRY ACCORDING TO OPTICAL PARAMETERS OF TEST SURFACE

BACKGROUND OF THE INVENTION

1. Field of the Invention

This invention pertains in general to the field of phase-shifting interferometry and, in particular, to a novel approach for mapping the profile of the surface of a test sample taking into account phase shifts related to the optical parameters of the sample material.

2. Description of the Related Art

Optical surface profilers based on phase-shifting interferometry (PSI) utilize phase measurements to calculate the surface height values, $h(x,y)$, at each point of a surface under test. The technique is founded on the concept of varying the phase difference between two coherent interfering beams of single wavelength in some known manner, such as by changing the optical path difference (OPD) in discrete steps or linearly with time. Under such conditions, three or more measurements of the light intensity at a pixel of a receiving sensor array can be used to determine the initial phase difference of the light beams at the point on the test surface corresponding to that pixel. Based on such measurements at each pixel of coordinates x and y, a phase distribution map $\phi(x,y)$ can be determined for the test surface, from which very accurate height data $h(x,y)$ are calculated by the following general equation in relation to the wavelength $\lambda$ of the light source used:

$$h(x,y) = \frac{\lambda}{4\pi} \Phi(x,y). \quad (1)$$

Phase-shifting interferometry provides a vertical resolution of the order of 1/100 of a wavelength or better and is widely used for measuring opaque surfaces of similar (homogeneous) materials. If the sample material is not dielectric (i.e., the extinction coefficient of the material is not zero), a phase change occurs on reflection from the sample (referred to in the art as Fresnel phase change on reflections). The phase changes on reflection from the surface of the sample vary with several parameters, including the optical constants of the material composing the surface of the sample. However, existing techniques for reconstructing surface profiles from phase measurements do not take into account phase changes that result from reflection of the light incident on the surface of the sample. This approximation is not a problem when the test sample's surface is made of similar material because the phase shift due to the optical parameters of the material is the same at each pixel. Since only relative phase changes from pixel to pixel are important for determining a surface profile, phase changes related to optical parameters can be neglected under these circumstances. On the other hand, when the sample surface is dissimilar (non-homogeneous), the optical-parameter variations from pixel to pixel result in nonuniform phase shifts that distort the measured surface profile. Therefore, unless these parameters are also known and accounted for, a correct profile measurement is improbable with conventional techniques.

The relationship between the phase change associated with a beam reflected at the interface between an incident medium (such as air) and a sample surface and the physical properties of the sample material is well understood in the art. For example, referring to the general case where a plane wave of monochromatic, linearly-polarized light of wavelength $\lambda$ is incident on the surface of an optically-opaque sample at an incidence angle $\theta_i$, the phase change $\Delta\phi$ of the beam reflected from the surface can be calculated by known equations having the following general functionality:

$$\Delta\phi_{TE} f_{TE}(n,k,\theta_i,\lambda) \quad (2a)$$

$$\Delta\phi_{TM} f_{TM}(n,k,\theta_i,\lambda) \quad (2b)$$

where TE and TM refer to the axes of polarization of the incident light, TE being parallel and TM being perpendicular, respectively, to the plane of incidence; and n and k are the refractive index and the extinction coefficient of the sample material, respectively. For details of the specific equations used in the art to define the relationship between these variables, see Born, Max and Emil Wolf, "Principles of Optics," 4th Edition, Pergamon Press, Bath, England, at pp. 615 and sequel.

It is known that the optical parameters n and k vary with the wavelength $\lambda$ of the incident light; therefore, for given wavelength and angle of incidence, Equations 2a and 2b can be expressed simply in terms of n an k; that, is, $\Delta\phi=\Delta\phi(n,k)$. Accordingly, the phase change $\Delta\phi$ of incident light of wavelength $\lambda$ reflected from a sample surface can be calculated exactly for each pixel if the refractive index and extinction coefficient at that wavelength and the angle of incidence are known for that pixel. Once a map of such phase shifts $\Delta\phi(x,Y)$ is known, a corrected phase distribution map $\phi_{CORR}(x,Y)$ can be determined by $$\phi_{CORR}(x,y)=\phi(x,y)+\Delta\phi(x,Y) \quad (3)$$

and used to calculate a corrected height map using Equation 1, which becomes $$h_{CORR}(x,y) = \frac{\lambda}{4\pi} \Phi_{CORR}(x,y). \quad (4)$$

Prior-art phase shifting techniques have completely neglected this correction because n and k are normally unknown for the material being tested. Also, as mentioned above, this correction is unnecessary for surfaces of similar material.

The quantities n and k are conventionally measured by ellipsometric techniques and vary with the wavelength of the light used for testing. In addition, they are usually not uniform within the surface of the test sample. Therefore, the refractive index and the extinction coefficient of the sample material are point quantities that in practice are not available during phase-shifting measurements for correction of errors introduced by nonuniformities or dissimilarities within the surface of the test sample. This aspect of phase-shifting interferometry remains a problem in the continuing effort to improve the accuracy and resolution of the technique.

The present invention is directed at providing an approach that improves prior-art techniques by estimating n and k at each measurement pixel of the material being tested and by obtaining phase-shift measurements that account for the phase changes related to the optical parameters of the sample surface.

BRIEF SUMMARY OF THE INVENTION

One primary goal of this invention is a phase-shifting interferometry procedure that accounts for phase shifts related to the refractive index and the extinction coefficient of the sample material.

Another important objective is a procedure that also yields an estimate of the refractive index and the extinction coefficient of the sample material at each pixel corresponding to the calculated surface profile.

Another goal is a procedure that produces surface maps of height, refractive index and extinction coefficient on line during conventional phase-shifting interferometry.

Yet another goal is apparatus that makes it possible to achieve the objectives of the invention in an efficient, practical and economically feasible implementation.

Finally, another objective is a procedure and corresponding apparatus that are suitable for direct incorporation with the hardware of existing interferometric surface profilers.

Therefore, according to these and other objectives, the present invention consists of the addition of a pupil mask with two substantially parallel slits and a polarizer in the optical path of a conventional phase-shifting interferometer. The pupil-mask/polarizer combination is adapted to produce a linearly-polarized wavefront of light reaching the sample surface at a predetermined angle of incidence, thereby producing a corresponding phase shift on reflection. The relative orientation of the mask and polarizer can be changed to take measurements with the polarizer parallel or perpendicular to the mask slits, in each case producing a phase shift on reflection related to the test sample's refractive index and extinction coefficient. Four phase-shifting measurements conducted at $\pi/2$ intervals for each polarization axis yield sufficient interferometric information to map n, k and the height profile of the sample surface. The optimal mask consists of an opaque disk structure having two opposite annular slits approximately 90-degrees wide and with an outer annular radius approximately twice the size of the inner annular radius.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

BRIEF DESCRIPTION OF THE DRAWINGS

FIG. 3 is a diagram of the light path through the pupil mask/polarizer of the invention.

FIG. 4 is a schematic representation of one embodiment of the pupil mask of the invention in plan view.

FIG. 5 is a schematic representation, in plan view, of an embodiment of the pupil mask/polarizer combination of the invention where a polarizer is rotatable with respect to a fixed mask.

FIG. 6 is a schematic representation, in plan view, of another embodiment of the pupil mask/polarizer combination of the invention where the mask is rotatable with respect to a fixed polarizer.

DESCRIPTION OF THE PREFERRED EMBODIMENTS OF THE INVENTION

The heart of this invention lies in the recognition that the utilization of a mask/polarizer combination in the pupil of a conventional interferometer's optics provides the means for estimating the refractive index and the extinction coefficient of a test surface and for simultaneously calculating improved phase values during the course of performing PSI measurements by conventional methods. Thus, one aspect of this invention is the incorporation of a pupil mask into the optics of an interferometer for causing a coherent beam of light directed to the sample to arrive at the sample's surface at a predetermined angle of incidence. Another aspect of the invention is the combination of such mask with a linear polarizer, so that the plane of vibration (transmission axis) of the incident light may be oriented in parallel with or perpendicular to the plane of incidence. A further aspect of the invention is the optimization of the geometry of the mask/polarizer combination in balancing the theoretical sufficiency of pinhole-size slits (to yield a well-defined angle of incidence) with the practical need for sufficient illumination of the light sensor to produce viable on-line light-intensity measurements.

Figure 1:
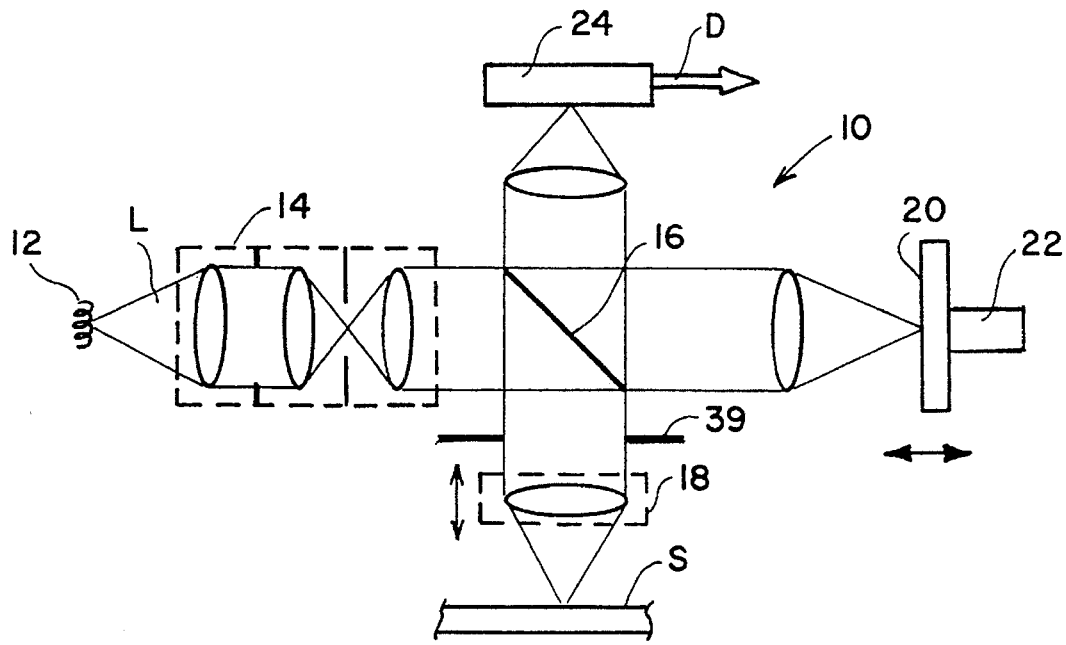
FIG. 1 is a simplified schematic representation of conventional phase-shifting interferometric apparatus.

Referring to the drawings, wherein like reference numerals and symbols are used for like parts, FIG. 1 is a schematic representation of conventional phase-shifting interferometric apparatus. The interferometer 10 comprises a light source 12 directing a beam L of light through an illuminator 14 toward a beam splitter 16, which reflects a portion of the light downward in the direction of a test surface S. The light reflected by the beam splitter 16 passes through a pupil 39 and microscope objective 18 focused on the test surface S. The portion of light transmitted through the beam splitter 16 is directed to a reference mirror 20 adapted for movement along the optical path to the mirror 20, so that interference fringes are produced for various values of the optical path difference between the reference mirror and the test surface S. Normally the translation of the mirror 20 (or, alternatively, of the sample S) is implemented by means of a piezoelectric element 22, which permits the movement of the mirror in precisely controlled steps. The beams reflected from the reference mirror 20 and the test surface S are recombined in the beam splitter 16 and directed upward to a light sensing device, such as a solid-state detector array 24. Typically, the detector array 24 consists of individual CCD cells or other sensing apparatus adapted to produce a two-dimensional array of digitized intensity data D corresponding to light signals received at each sensor cell as a result of the interference of the coherent light beams reflected from individual x-y coordinates or pixels in the surface S and from corresponding coordinates in the reference mirror 20. Appropriate electronic hardware (not shown)is provided to transmit the digitized intensity data D generated by the detector to a microprocessor for processing. The microscope objective 18 is adapted for vertical movement to focus the image of the test surface on the detector array 24.

Figure 2:
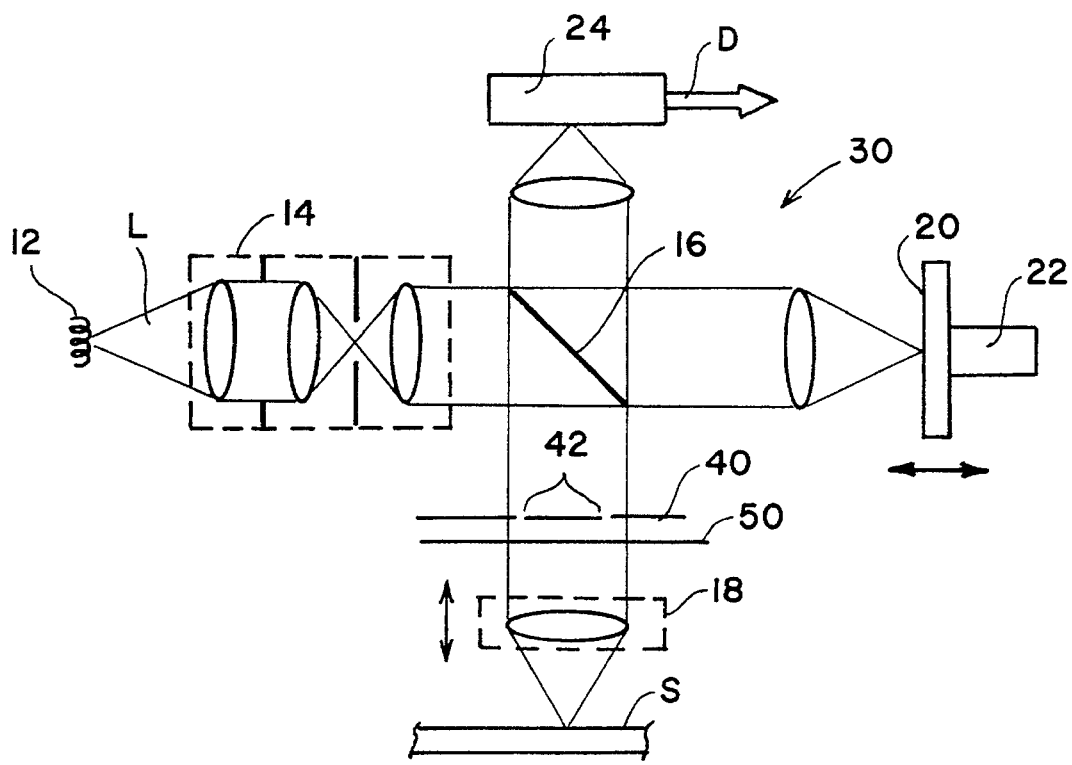
FIG. 2 is a simplified schematic representation of a phase-shifting interferometer incorporating the pupil mask/polarizer combination of the present invention.

As illustrated in FIG. 2, the interferometer 30 of the present invention combines a pupil mask 40 and a polarizer 50 with the objective 18. According to a general embodiment of the invention, the mask 40 consists of an opaque disk with two parallel slits 42 sufficiently spaced apart to cause the light ray L to arrive at the surface S of the sample at a predetermined, measurable angle of incidence. Referring to the schematic representation of FIG. 3, the path followed by the ray L passing through the slits 42 of the mask 40 and reflected by the sample surface S is illustrated. The light from either slit 42 strikes the surface S at an angle of incidence $\theta$ and is reflected through the other slit back toward the beam splitter 16. The angle of incidence $\theta$ is a direct trigonometric function of the focal length f of the objective 18 and the spacing $2w$ between the two slits 42, thereby permitting the design of the apparatus to produce a predetermined angle of incidence as chosen for a particular application. A plan view of the mask 40 is illustrated in FIG. 4, where cross-hatching is used to indicate the opaque portions of the mask.

The placement of the linear polarizer 50 in the path traveled by the light ray L makes it possible to selectively choose a polarized incident beam with the axis of polarization parallel or perpendicular to the plane of incidence (normally referred to in the art as TE and TM or S and P states), thereby meeting the conditions for the application of the known mathematical relationships generally referred to as Equations 2a and 2b. The specific mathematical equations are not reported here because of their complexity and limited relevance to the point of the invention, but they are well established in the field's literature and known to those skilled in the art.

Thus, the interferometer 30 of the invention can be utilized to make light intensity measurements that reflect the effect of the optical parameters n and k on the overall phase shift of the wavefront L. By performing phase-shifting interferometry at predetermined OPD steps, multiple measurements of light intensities at the detector 24 provide the data necessary to solve Equations 2a and 2b according to procedures that are well known in the art. It is noted that for a given wavelength and angle of incidence (which can be predetermined by the design and operating parameters), each equation has three unknowns, $\phi$, n and k. Therefore, three measurements would suffice to solve the equations for these parameters at each pixel of the test surface. In practice, it was determined that eight total measurements, four for each polarization condition, performed at $\pi/2$ translation intervals, provide redundant data that can advantageously be used to calculate $\phi$, n and k by conventional maximum-likelihood estimation procedures.

It is noted that the apparatus of the invention may comprise a fixed pupil mask 40 combined with a rotatable polarizer 50 adapted for parallel or perpendicular alignment with the slits 42 of the mask, or a fixed polarizer combined with a rotatable pupil mask adapted for parallel or perpendicular alignment with the transmission axis of the polarizer. The two configurations and relative positions are illustrated schematically in FIGS. 5 and 6, where the pupil mask/polarizer combination is shown as seen from line 5—5 in FIG. 3 and the arrows P indicate the plane of vibration of the light passing through the polarizer.

Figure 7:
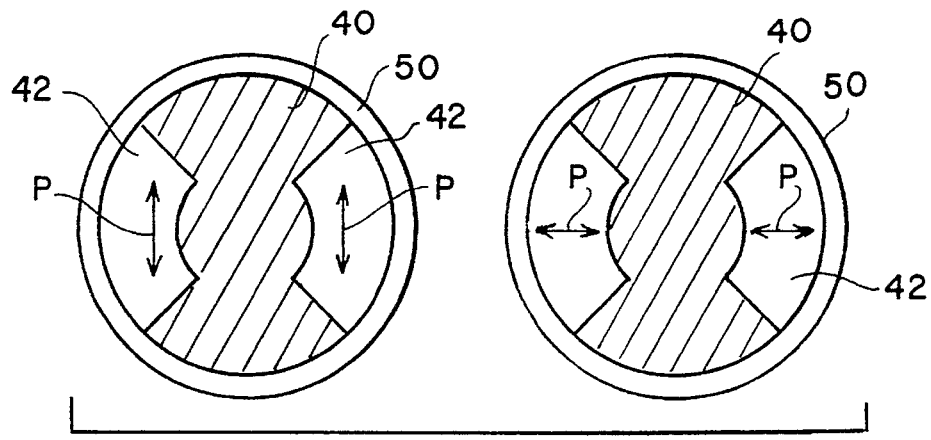
FIG. 7 is a schematic representation, in plan view, of a preferred embodiment of the pupil mask/polarizer combination of the invention where the polarizer is rotatable with respect to a fixed mask and the mask comprises two opposite annular slits approximately 90-degrees wide and with an outer annular radius approximately twice the size of the inner annular radius.
Figure 8:
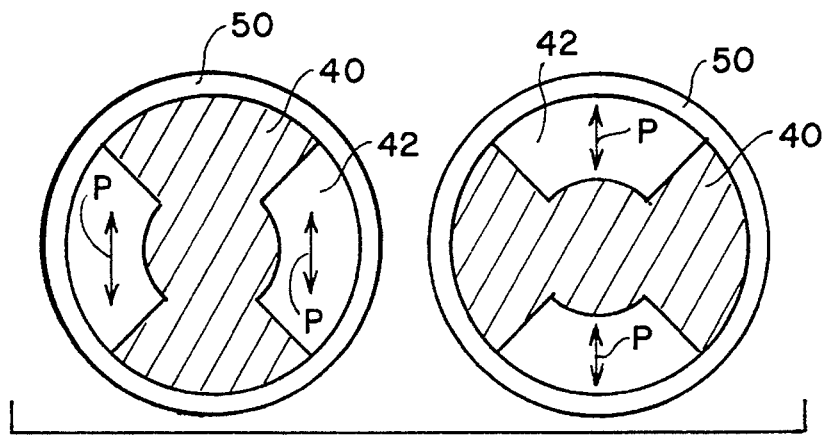
FIG. 8 is a schematic representation, in plan view, of another preferred embodiment of the pupil mask/polarizer combination of the invention where the mask is rotatable with respect to a fixed polarizer and the mask comprises two opposite annular slits approximately 90-degrees wide and with an outer annular radius approximately twice the size of the inner annular radius.

Another aspect of the invention is the design of an optimal geometry for the pupil mask 40 to ensure maximum illumination of the light detector 24 while retaining an effective angle of incidence approximately equal to the chosen design value. To that end, a mathematical model of the electric field vector in the direction of motion of the light wave L through the mask 40 was developed and analyzed. It results that, based on a reasonable engineering tradeoff to provide large illumination with relative little decrease of the average incidence angle from the maximum afforded by the lens, the preferred embodiment of the mask of the invention consists of a structure comprising two annular slits extending over approximately 90 degrees (i.e., one quadrant) on opposite sides of the center of the mask. The radial size of each slit is such that the outer annular radius is no greater than twice the inner annular radius, twice providing large illumination while retaining an acceptable approximation of the angle of incidence. Such a mask is illustrated in FIGS. 7 and 8 in fixed-mask and fixed-polarizer configurations, respectively, where within each figure the pupil mask is shown aligned parallel and perpendicular to the linear polarizer, as also seen in FIGS. 5 and 6.

Figure 9:
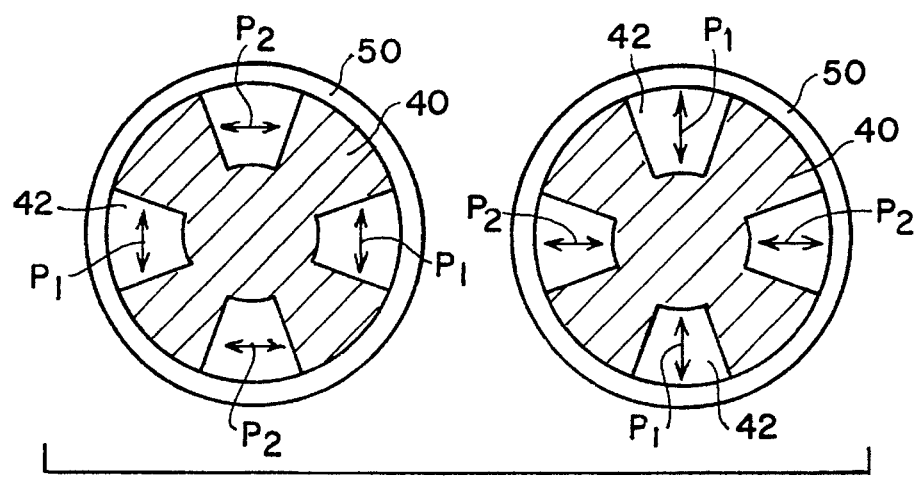
FIG. 9 is a schematic representation, in plan view, of an equivalent embodiment of the pupil mask/polarizer combination of the invention where the mask includes four slits approximately 45 degrees wide and a polarizer having two orthogonal transmission axes, one for each pair of opposite quadrants.

Various changes in the details, steps and components that have been described may be made by those skilled in the art within the principles and scope of the invention herein illustrated and defined in the appended claims. For example, the pupil mask/polarizer combination could be constructed by one skilled in the art to include four slits approximately 45 degrees wide (one in each quadrant) and a polarizer having two orthogonal transmission axes, P1 and P2, one for each pair of opposite quadrants. This combination would produce a mask/polarizer pair equivalent to the preferred embodiments of FIGS. 7 and 8. Such a pair is illustrated in FIG. 9 for a system comprising a fixed pupil mask combined with a rotatable polarizer.

Similarly, the invention is described in a system comprising a single-lens objective 18 focusing the light ray L passing through one slit 42 of the mask onto the sample surface S and transmitting the reflected light through the slit on the opposite side of the lens. Those skilled in the art readily understand that the same optical effect could be achieved in equivalent fashion by utilizing multiple mask/lens combinations adapted to transmit the polarized light beam L so that it reaches the sample surface S at a predetermined angle of incidence 8 through one lens and the return beam is recombined with the reference beam after passing through a separate lens, thereby providing the same optical function as illustrated in the preferred embodiment of the invention.

Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and devices.

I claim:

1. A phase-shifting interferometer that comprises:
   (a) light-source means for producing a light wavefront split between a sample surface and a reference surface;
   (b) lens means disposed in an optical path to said sample surface for focusing said light wavefront on the sample surface;
   (c) a light-intensity sensor adapted to detect a combination of wavefronts reflected form said reference surface and said sample surface;

(d) opaque mask means disposed within said optical path to the sample surface, said mask means comprising at least two spaced-apart slits adapted to cause said wavefront produced by the light-source means to arrive at the sample surface at a predetermined angle of incidence;

(e) linear polarizer means positioned within said optical path to the sample surface; and (f) scanning means for effecting a relative translation between the sample surface and the reference surface to achieve multiple optical path differences at which light-intensity outputs are produced and used to calculate a surface-height output corresponding to the sample surface.

2. The interferometer of claim 1, wherein a relative position between the mask means and polarizer means is adjustable to produce a linearly polarized light beam oriented substantially in parallel with or perpendicular to a plane of incidence of the polarized light beam on the sample surface.

3. The interferometer of claim 2, wherein the mask means is rotatable and the polarizer means is fixed.

4. The interferometer of claim 2, wherein the polarizer means is rotatable and the mask means is fixed.

5. The interferometer of claim 1, wherein the mask means consists of an opaque disk comprising two annular slits extending over approximately 90 degrees on opposite sides of the disk, each slit having an outer annular radius no greater than twice an inner annular radius thereof.

6. The interferometer of claim 1, wherein the mask means consists of an opaque disk comprising two annular slits extending over approximately 90 degrees on opposite sides of the disk, each slit having an outer annular radius approximately equal to twice an inner annular radius thereof.

7. The interferometer of claim 2, wherein the mask means consists of an opaque disk comprising two annular slits extending over approximately 90 degrees on opposite sides of the disk, each slit having an outer annular radius no greater than twice an inner annular radius thereof.

8. The interferometer of claim 2, wherein the mask means consists of an opaque disk comprising two annular slits extending over approximately 90 degrees on opposite sides of the disk, each slit having an outer annular radius approximately equal to twice an inner annular radius thereof.

9. The interferometer of claim 7, wherein the disk is rotatable and the polarizer is fixed.

10. The interferometer of claim 7, wherein the polarizer is rotatable and the disk is fixed.

11. In a phase-shifting interferometer that comprises light-source means capable for producing a light wavefront split between a sample surface and a reference mirror, a focusing lens disposed in an optical path to said sample surface, a light-intensity sensor adapted to detect a combination of wavefronts reflected form said reference mirror and said sample surface, and scanning means for effecting a relative translation between the sample surface and the reference mirror to achieve multiple optical path differences at which light-intensity outputs are produced and used to calculate a surface-height output corresponding to the sample surface, the improvement consisting of:

an opaque mask disposed within said optical path to the sample surface, and a linear polarizer positioned within said optical path to the sample surface;

wherein said mask comprises at least two spaced-apart slits adapted to cause said wavefront produced by the light-source means to arrive at the sample surface at a predetermined angle of incidence; and wherein a relative position between the mask and polarizer is adjustable to produce a linearly polarized light beam oriented substantially in parallel with or perpendicular to a plane of incidence of the polarized light beam on the sample surface.

12. The improvement of claim 11, wherein the mask is rotatable and the polarizer is fixed.

13. The improvement of claim 11, wherein the polarizer is rotatable and the mask is fixed.

14. The improvement of claim 11, wherein the mask comprises two annular slits extending over approximately 90 degrees on opposite sides of the mask, each slit having an outer annular radius no greater than twice an inner annular radius thereof.

15. The improvement of claim 11, wherein the mask comprises two annular slits extending over approximately 90 degrees on opposite sides of the mask, each slit having an outer annular radius approximately equal to twice an inner annular radius thereof.

16. The improvement of claim 15, wherein the mask is rotatable and the polarizer is fixed.

17. The improvement of claim 15, wherein the polarizer is rotatable and the mask is fixed.

18. A method for measuring the profile of a sample surface by phase-shifting interferometry accounting for the refractive index and extinction coefficient of the sample material, comprising the following steps:

(a) providing an interferometer that comprises light-source means capable of producing a light wavefront split between a sample surface and a reference mirror; a focusing lens disposed in an optical path to said sample surface; a light-intensity sensor adapted to detect a combination of wavefronts reflected form said reference mirror and said sample surface; an opaque mask disposed within said optical path to the sample surface, said mask comprising at least two spaced-apart slits adapted to cause the wavefront produced by the light-source means to arrive at the sample surface at a predetermined angle of incidence; a linear polarizer positioned within said optical path to the sample surface; and scanning means for effecting a relative translation between the sample surface and the reference mirror to achieve multiple optical path differences therebetween at which light-intensity outputs are produced and used to calculate a surface-height output corresponding to the sample surface; wherein a relative position between the mask and polarizer is adjustable to produce a linearly polarized wavefront oriented substantially in parallel with or perpendicular to a plane of incidence of the polarized wavefront on the sample surface;

(b) adjusting said relative position between the mask and polarizer to produce a linearly polarized wavefront oriented either substantially in parallel with or substantially perpendicular to a plane of incidence of the polarized wavefront on the sample surface;

(c) performing phase-shifting interferometry at multiple scanning positions;

(d) adjusting the relative position between the mask and polarizer by substantially 90 degrees;

(e) performing phase-shifting interferometry at multiple scanning positions;

(f) utilizing the phase measurements derived from steps (c) and (e) to calculate a refractive index and an extinction coefficient of the sample material and a height profile of the sample surface.

19. The method of claim 18, wherein the mask is rotatable and the polarizer is fixed.

20. The method of claim 18, wherein the polarizer is rotatable and the mask is fixed.

21. The method of claim 18, wherein the mask comprises two annular slits extending over approximately 90 degrees on opposite sides of the mask, each slit having an outer annular radius no greater than twice an inner annular radius thereof.

22. The method of claim 18, wherein the mask comprises two annular slits extending over approximately 90 degrees on opposite sides of the mask, each slit having an outer annular radius approximately equal to twice an inner annular radius thereof.

23. The method of claim 22, wherein the mask is rotatable and the polarizer is fixed.

24. The method of claim 22, wherein the polarizer is rotatable and the mask is fixed.

* * * * *